United States Patent [19]
Wood et al.

[11] Patent Number: 6,162,851
[45] Date of Patent: Dec. 19, 2000

[54] FLAME RETARDANT POLYOLEFINS FOR MOLDING APPLICATIONS

[75] Inventors: Michael T. Wood, Mogadore; Steven D. Landau, North Canton; Victor W. Lee, New Philadelphia; Ralph E. WyKoff, Massillon, all of Ohio

[73] Assignee: ICC Industries Inc., Dover, Ohio

[21] Appl. No.: 09/043,189

[22] PCT Filed: Jul. 16, 1997

[86] PCT No.: PCT/US97/12749

§ 371 Date: Mar. 11, 1998

§ 102(e) Date: Mar. 11, 1998

[87] PCT Pub. No.: WO98/03587

PCT Pub. Date: Jan. 29, 1998

[51] Int. Cl.[7] .................................................. C08K 3/10
[52] U.S. Cl. ..................... 524/411; 524/405; 524/406
[58] Field of Search ............................................. 524/411

[56] References Cited

U.S. PATENT DOCUMENTS

| 4,563,488 | 1/1986 | Minami | 523/222 |
|---|---|---|---|
| 5,109,045 | 4/1992 | Price | 524/94 |
| 5,635,060 | 6/1997 | Hagen | 210/198.2 |
| 5,645,603 | 7/1997 | Peters | 623/20 |

*Primary Examiner*—Paul R. Michl
*Attorney, Agent, or Firm*—Oldham & Oldham Co., L.P.A.

[57] ABSTRACT

A highly flame retardant, impact modified polyolefin alloy is described, the composition of which includes: at least one polyolefin; at least one halogenated organic flame retardant; at least one semi-crystalline ethylene copolymer impact modifier, the copolymer optionally being functionalized, at least one oxygen-containing metal compound wherein the metal is selected from the group consisting of Group III, IV, V, and VI of the Periodic Table; and at least one fluorocarbon, at least a portion of which is fibrillated or fibrillatable. Optionally, the alloy will contain at least one of a functionalized silicone polymer, a hydrated metal silicate, a hydrated metal borate, a primary antioxidant, and a secondary antioxidant. Such thermoplastic polymer blends/alloys can be produced by combining all ingredients in a melt and applying shear to the melt through means of a high shear internal/continuous mixer or an extruder.

23 Claims, 7 Drawing Sheets

FLAME RETARDANT POLYOLEFINS FOR MOLDING APPLICATIONS

TECHNICAL FIELD

Polyolefins are synthetic organic thermoplastics that are composed of carbon and hydrogen and as such, are inherently flammable. Applications incorporating polyolefins such as: construction, transportation, electrical, home furnishings, toys, outdoor play equipment, industrial tanks, containers, materials handling equipment and housewares, demand compliance with mandatory flame retardancy requirements, thereby requiring the addition of flame retardant additives.

A variety of flame retardant additives have been developed specifically for treatment of polyolefins to hinder ignition and reduce flame spread so the polyolefin can meet the required flammability specifications. Typically, most additive type flame retardants are incompatible with the polymer matrix and lead to detrimental mechanical and physical effects which are demonstrated by an observable loss in physical property attributes, particularly impact strength. The usual result is a compromise between deteriorated physical properties and the desired enhancement of combustion resistance.

Flame retardants typically act by one of three possible modes of operation: (1) Flame Phase Reaction wherein the flame retardant additive alters the composition of the decomposition products of the polymer, quenches free radical chain reactions and reduces the energy available for combustion thus making it less exothermic (combinations of halogen and antimony work in this manner); (2) Condensed Phase Reactions wherein the additives work by inducing the formation of carbonaceous char instead of the highly volatile, combustible gases, the char providing a layer of insulation that protects the unreacted surface from the heat source (phosphorus based compounds act as char formers as do inorganic materials and certain halogen containing compounds); and (3) Heat Absorption Reactions wherein the additives work by providing a heat sink through the evaporation of water of hydration which in turn can have a surface cooling effect thus preventing ignition (alumina trihydrate and magnesium hydroxide operate in this manner).

To date there is no ideal flame retardant commercially available. They all have detrimental effects on the physical properties of the polymer they are incorporated in. It would, therefore, be desirable to provide a highly flame retardant, impact resistant polyolefin as well as a method for imparting flame retardance and improved impact resistance to polyolefin compositions in which the additives are uniformly dispersed throughout the composition.

SUMMARY OF THE INVENTION

It is an object of this invention to provide a halogenated flame retardant polyolefin compositions with improved impact.

It is a further object of this invention to provide a method of preparing a novel halogenated flame retardant polyolefin composition having the flame retardant additives uniformly dispersed therein.

It is yet another object of the invention to provide a method of preparing a novel impact resistant flame retardant polyolefin composition having the impact modifying additives uniformly dispersed therein.

It is still another object of this invention to provide novel compositions of matter based upon unobvious and unique combinations of various flame retardant additives.

Generally speaking, the present invention is directed to a novel impact modified flame retardant polyolefin composition. The compositions comprise: a polyolefin polymer; at least one functionalized low crystalline ethylene copolymer or at least one non-functionalized semi-crystalline ethylene copolymer; at least one halogen containing organic flame retardant; at least one metal oxide; at least one fluoropolymer; and at least one functionalized silicone additive.

Optionally, the composition further comprises at least one of, and preferably all of: at least one inorganic flame retardant compound; at least one hydrated metallic silicate compound; at least one primary antioxidant; and at least one secondary antioxidant. The composition exhibits a high degree of flame resistance and also exhibits high impact retention and/or improvement.

A method of preparing polyolefin polymer compositions containing several flame retardant additives as well as a chemically functionalized impact modifier, all of which are uniformly dispersed therein.

The process is conducted at a temperature sufficient to achieve a thoroughly melted polymer of such viscosity as to not reduce the controlling modulus of the melt so that sufficient shear is maintained as well as to not overload the high shear mixing equipment by developing too high of a controlling modulus. The normal temperature range for the polymer melt is about 270° F. to about 370° F. The process is carried out either in a batch type process such as in an internal mixer or may be carried out in a continuous process such as in a continuous mixer or still further may be carried out in a continuous process such as a twin screw extruder in which the all of the components may be fed at one location such as the main feed throat or the additives may be split and fed subsequently down stream at various locations. One of the important factors is the development of high shear in order to properly disperse and distribute all ingredients homogeneously throughout the polymer matrix.

These and other objects of this invention will be evident when viewed in light of the drawings, detailed description, and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE PREFERRED EMBODIMENTS

Figure 1:
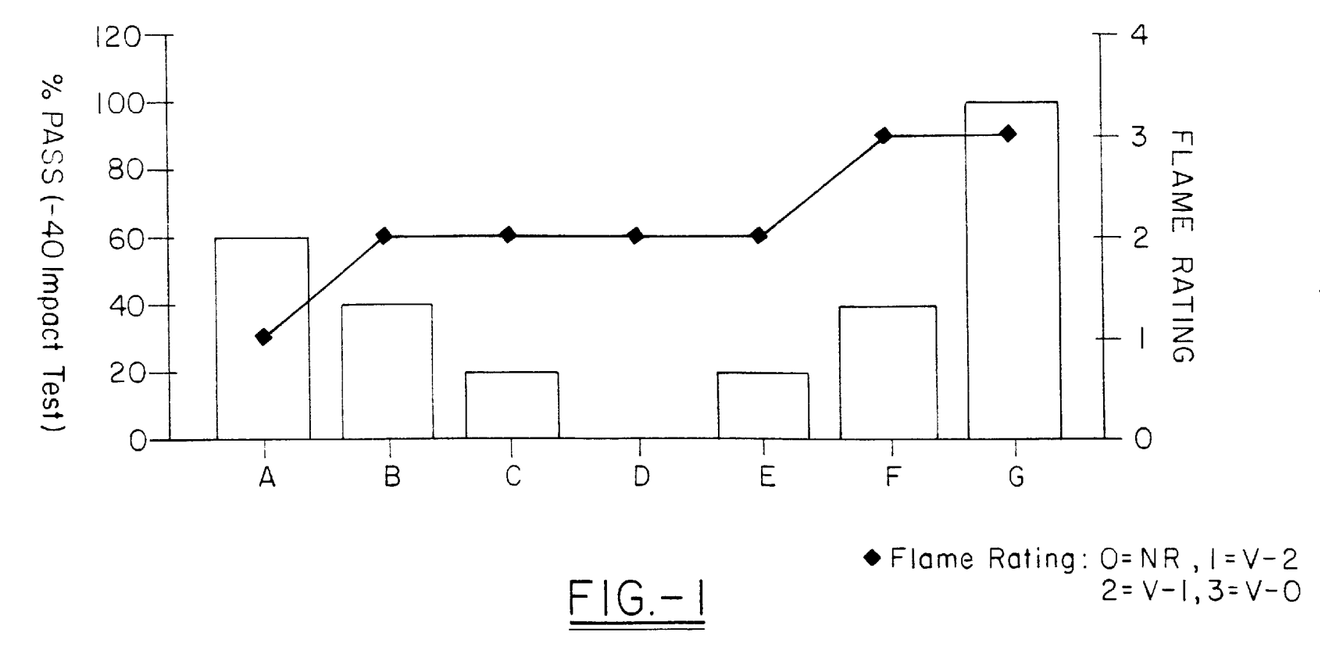
FIG. 1 graphically displays the data of Table 1 showing a comparison of the % of test specimens per formula that passed the −40 Impact test, each of which was dropped from the following drop heights, 256 in-lb., 272 in-lb., 288 in-lb., 304 in-lb., and 320 in-lb., on the Y-axis whereas the flame rating of each formula is shown in the Y' axis.
Figure 2:
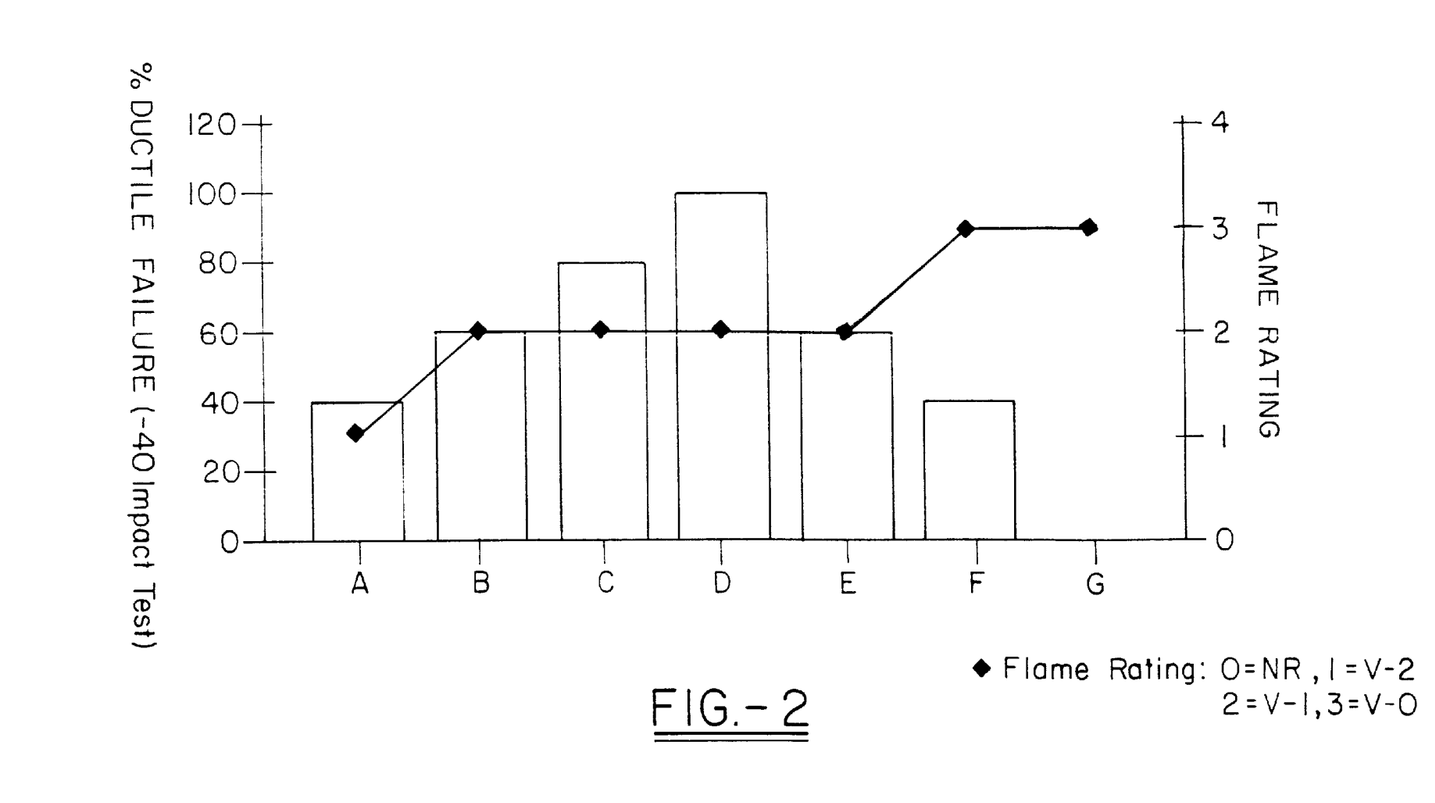
FIG. 2 graphically displays information similar to that shown in FIG. 1 for the −40 Impact Ductile Failure test.
Figure 3:
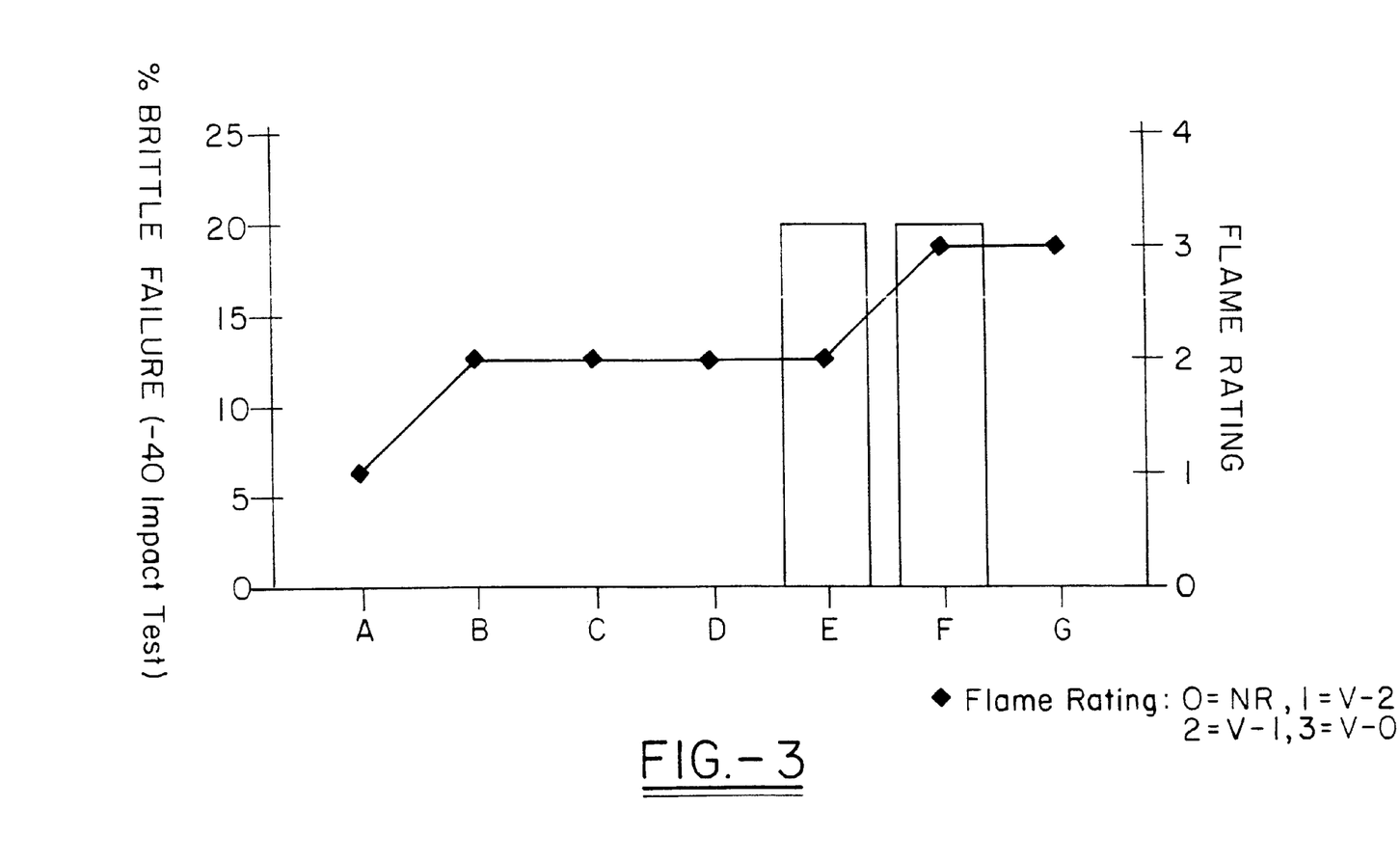
FIG. 3 graphically displays information similar to that shown in FIG. 1 for the data of Table 2 for the −40 Impact Brittle Failure test.
Figure 4:
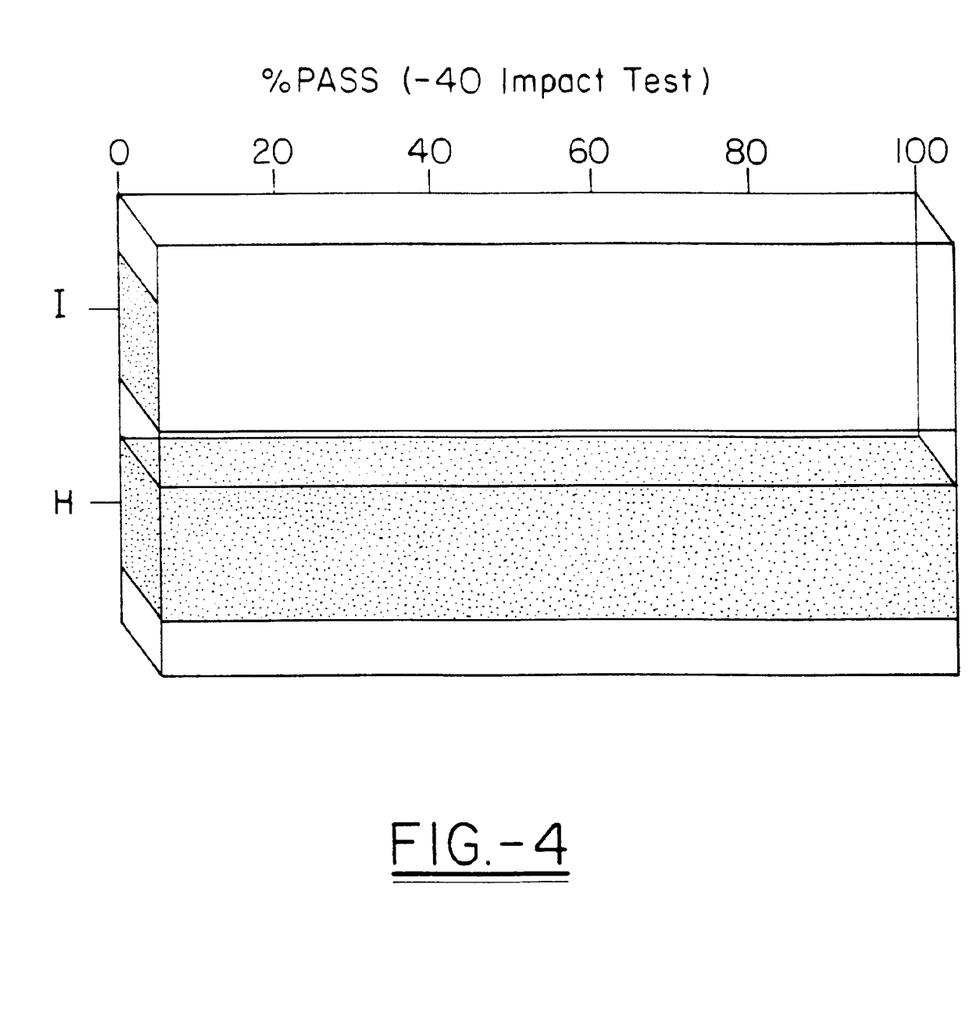
FIG. 4 graphically displays information similar to that shown in FIG. 1 for the data of Table 2 for the −40 Impact test.
Figure 5:
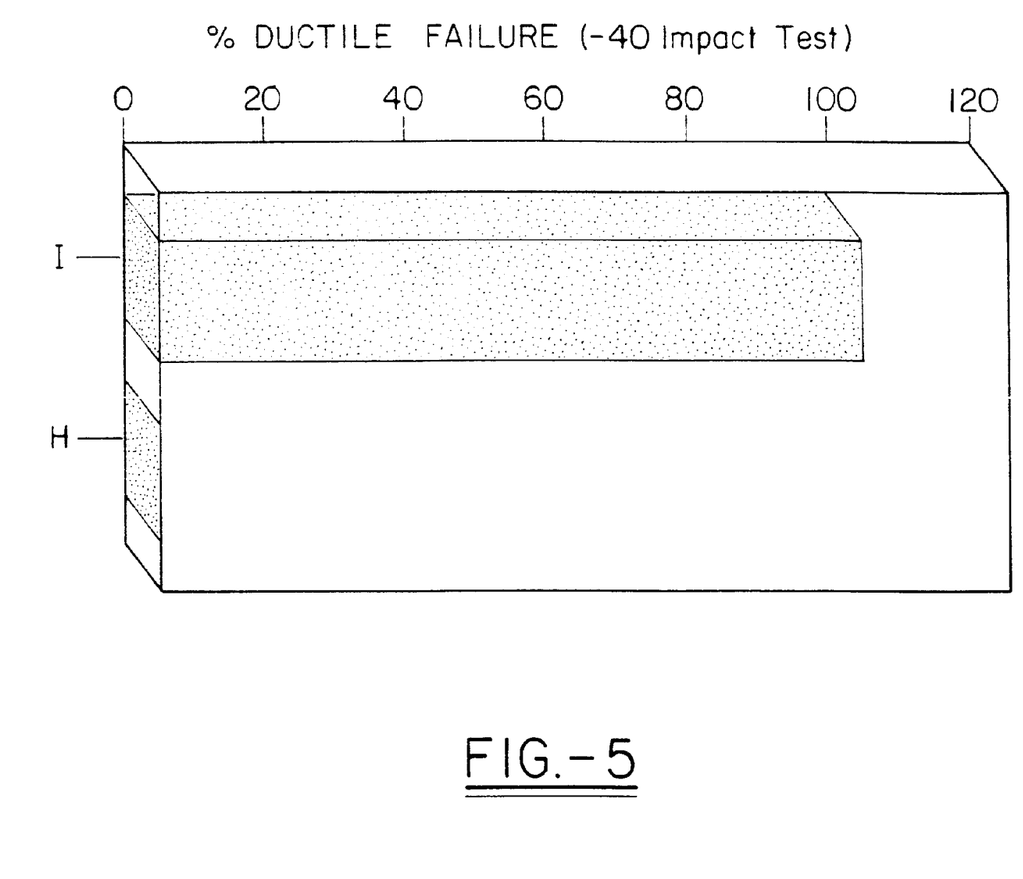
FIG. 5 graphically displays information similar to that shown in FIG. 1 for the −40 Impact Ductile Failure test.
Figure 6:
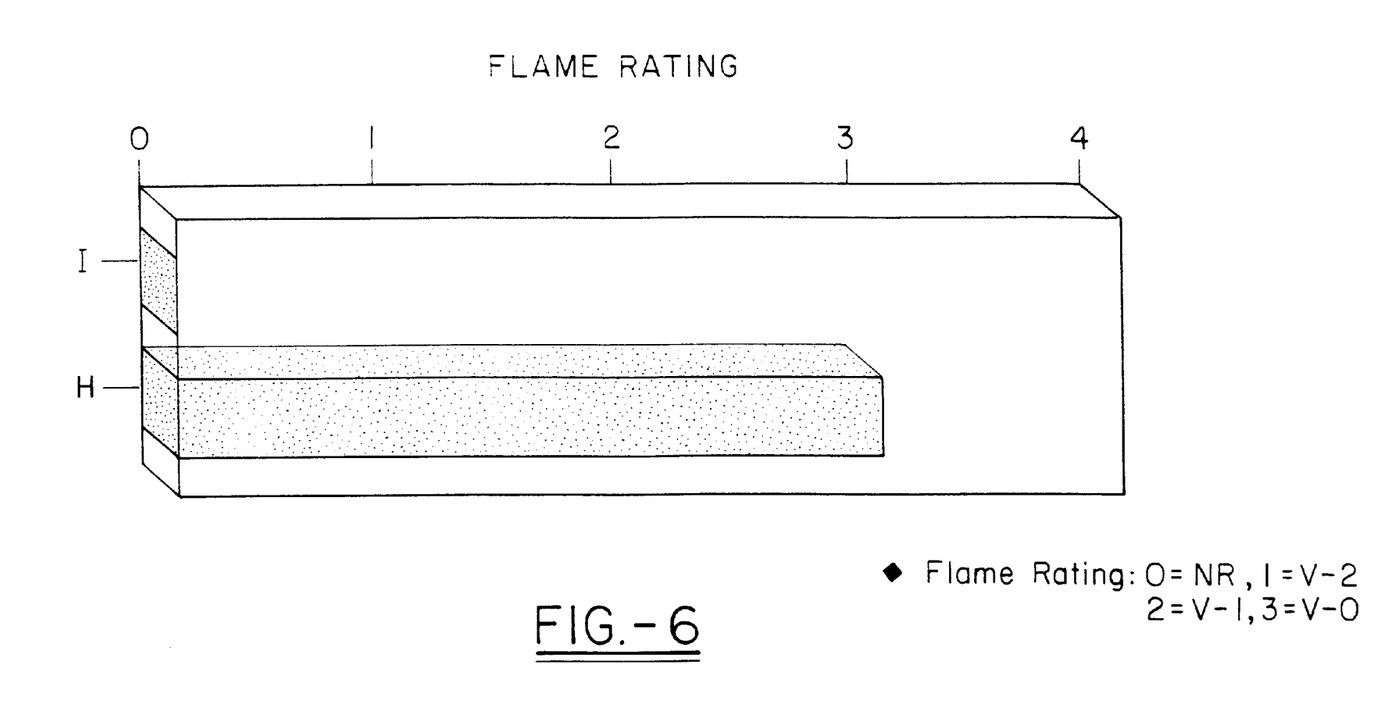
FIG. 6 graphically displays the flame rating of the two formulas in Table 2 wherein NR represents [no-rating], i.e., a sample that burns out of control.
Figure 7:
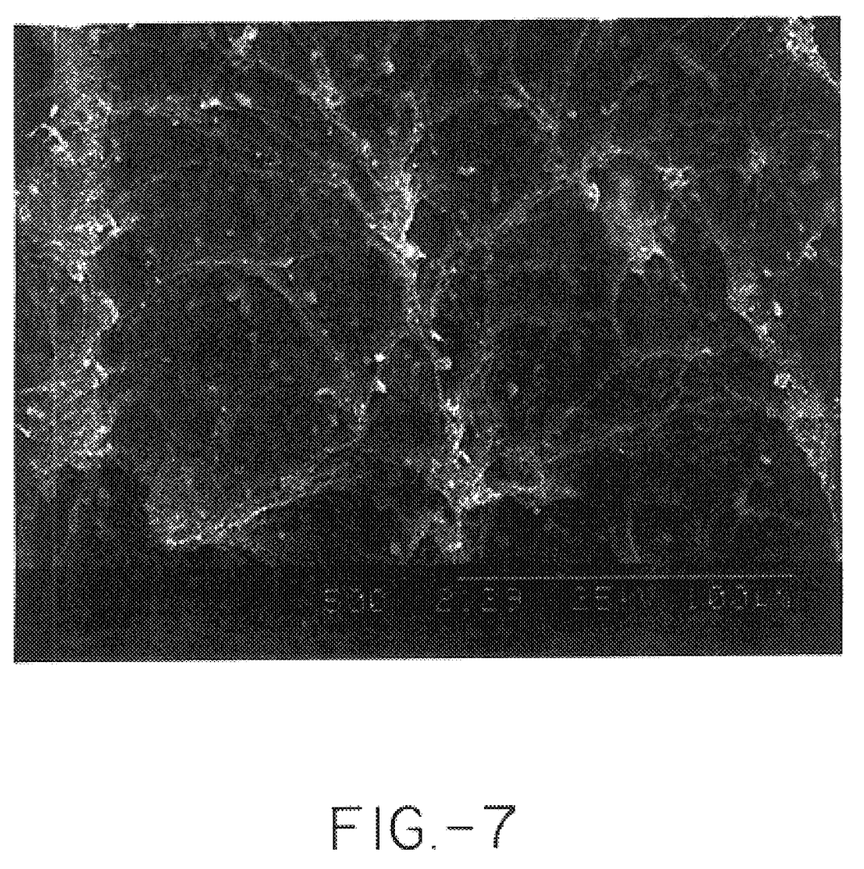
FIG. 7 is a scanning electron micrograph at 500 times magnification showing the uniform dispersion of flame retardant additive particulates.

The impact modified flame retardant polyolefin polymer composition comprises: a polyethylene containing polymer; at least one functionalized semi-crystalline ethylene copolymer or at least one non-functionalized semi-crystalline ethylene copolymer to serve as an impact modifier; at least one halogen containing organic flame retardant; at least one oxygen-obtaining metal of Group III, IV, V, or VI of the Periodic Table, preferably at least one metal oxide, and at least one fluorocarbon polymer, at least a portion of which is fibrillatable. Optionally, the composition includes at least one, and preferably more than one of: at least one inorganic flame retardant compound; at least one hydrated metal silicate or metal borate compound; at least one primary antioxidant; at least one functionalized silicone additive; and at least one secondary antioxidant. The composition exhibits a high degree of flame resistance and also exhibits high impact retention.

The novel impact modified flame retardant polyolefin composition comprises melt compounding a polyethylene polymer with a halogen containing organic flame retardant additive in an amount sufficient to impart a halogen content to the composition of from about 6 to about 40% halogen content, more preferably from about 13 to about 19% halogen content; with about 3 to about 10% metal oxide, with about 5 to about 40% of a chemically functionalized or non-functionalized flexible semi-crystalline ethylene copolymer, and with about 0.05 to about 1.0% of a polytetrafluoroethylene polymer for which at least a portion thereof, preferably from about 2 to about 100%, is fibrillated or fibrillatable. In an alternative preferred embodiment, the polytetrafluoroethylene polymer will further comprise from about 1% to about 30% by weight molybdenum disulfide. The process further comprises adding at least one, and preferably all of: about 0 to about 20% of a hydrated metallic silicate and/or hydrated metal borate, with about 0 to about 5% of a chemically functionalized silicone compound resin modifier, with about 0 to about 1% of a primary antioxidant, and with about 0 to about 1% of a secondary antioxidant.

The halogen containing flame retardant additive is selected from the representative and illustrative groups consisting of [a] organic aromatic halogenated compounds, [b] organic cycloaliphatic halogenated compounds, and [c] organic aliphatic halogenated compounds. Exemplary specific and representative organic halogen containing flame retardant additives include but are not restricted to: pentabromophenyl ether, decabromodiphenyl ethane, 1,2-bis (tetrabromophthalimido) ethane, 1,2,3,4,7,8,9,10,13,13,14,14-dodecachloro-1,4,4a,5,6,6a,7,10,10a,11,12,12a-dodecahydro-1,4,7,10-dimethanodibenzo (a,e) cyclooctene, octabromotrimethylphenyl indane, proprietary non-diphenyl aromatic bromine.

Exemplary specific and representative inorganic flame retardant compounds include but are not limited to: inorganic compounds containing oxygen and a metal of Group III, IV, V or VI of the Periodic Table. The inorganic compounds containing oxygen of a metal of Group III, IV, V, or VI may be oxides, hydroxide, carbonates, silicates, molybdates or more complicated compounds of the relative metals such as various minerals. Typical examples would include antimony trioxide, antimony pentoxide, sodium antimonate, aluminum oxide, zinc oxide, iron oxide, titanium dioxide, aluminum hydroxide, magnesium hydroxide, kaolin, zinc borate, molybdenum trioxide and various hydrated metals.

Exemplary specific and representative chemically functionalized semi-crystalline ethylene copolymer impact modifiers include but are not limited to: butene-ethylene, hexene-ethylene, and octene-ethylene copolymers chemically modified with maleic anhydride such as taught for example in U.S. Pat. No. 5,262,467, which is herein by fully incorporated by reference. These ethylene copolymers are typically very low density polyethylenes (VLDPE). The VLDPE is a copolymer of ethylene and at least one a-olefin having from 3 to 12 carbon atoms inclusive, preferably from 3 to 8 carbon atoms inclusive. The density of the copolymer is equal to or less than 0.915 g/cc and is preferably no lower than 0.860 g/cc. Suitable and representative α-olefins would include, but not be limited to, propylene, 1-butene, 1-hexene, 4-methyl-1-pentene and 1-octene. The portion of the VLDPE attributed to the comonomer(s), other than ethylene, is in the range of about 1% to about 49% by weight based on the weight of the copolymer and is preferably in the range of about 10% to about 40% by weight. Anhydrides of unsaturated aliphatic diacids are commonly grafted to various polyolefins. These anhydrides can have 4 to 20 carbon atoms and preferably have 4 to 10 carbon atoms. Examples of anhydrides are maleic anhydride, itaconic anhydride and nadic anhydride or nadic methyl anhydride. The preferred anhydride is maleic anhydride. The anhydride grafted polyethylene can contain about 0.05 to about 5 parts by weight of anhydride per 100 parts by weight of ethylene copolymer and preferably contains about 0.1 to about 2 parts by weight of anhydride per 100 parts by weight of ethylene copolymer.

Exemplary specific and representative non-functionalized semi-crystalline ethylene copolymer impact modifiers include but are not limited to: butene-ethylene copolymers, hexene-ethylene copolymers, and octene-ethylene copolymers. These ethylene copolymers are typically very low density polyethylenes (VLDPE). The VLDPE is a copolymer of ethylene and at least one α-olefin having from 3 to 12 carbon atoms inclusive, preferably from 3 to 8 carbon atoms inclusive. The density of the copolymer is equal to or less than 0.915 g/cc and is preferably no lower than 0.860 g/cc. Suitable and representative α-olefins would include, but not be limited to, propylene, 1-butene, 1-hexene, 4-methyl-1-pentene and 1-octene. The portion of the VLDPE attributed to the comonomer(s), other than ethylene, is in the range of about 1% to about 49% by weight based on the weight of the copolymer and is preferably in the range of about 10% to about 40% by weight.

Exemplary specific and representative fluoropolymers include but are not limited to: polytetrafluoroethylene. In a more preferred embodiment, the fluoropolymer will further comprise at least a portion of a polytetrafluoroethylene which is fibrillatable and/or fibrillated in the composition, such as is described in U.S. Pat. No. 4,962,136, which is fully herein by incorporated by reference. Specifically preferred are compositions which comprise from about 2% to about 98% polytetrafluoroethylene with a balance of the composition being fibrillated polytetrafluoroethylene. Even small amounts, i.e., from about 2% to about 6% by weight of fibrillated polytetrafluoroethylene uniformly mixed in elastomer compositions can provide unexpected increases in physical properties. It should be understood that reference to "fibrillated PTFE" in this application means PTFE that is fibrillated in the body of the composition. Such "fibrillated PTFE" is manufactured as a coagulated dispersion polymer which may fibrillate under shear and is thus capable of fibrillation. As purchased, the fibrillated PTFE are coagulated dispersion polymer particles. FLUON CD1, manufactured by ICI Americas, Inc., is one such fibrillated PTFE. Such PTFE is preferably added to the mixer and fibrillated as it is mixed with the other components of the composition.

Optionally, the fluoropolymer is combined with an effective amount of molybdenum disulfide. It is believed that the molybdenum disulfide permits the elastomer to wet the surface of the particulate polytetrafluoroethylene and contributes to the fibrillation of fibrillated PTFE. It is also believed that the presence of effective amounts of molybdenum disulfide permits the intimate dispersion and mechanical interaction of the elastomer and PTFE in percentages of polytetrafluoroethylene which can be greater than 25% by weight of the total composition. It is believed that effective amounts of molybdenum disulfide permits the intimate mixing of solid components with elastomers with a reduced heat buildup and a reduced loss of elastomer scorch safety, not only with the PTFE particulate matters, but with other particulate matter, preferably including PTFE powders capable of fibrillation, and that an amount of molybdenum disulfide that is effective to uniformly incorporate the particulate material, and most particularly, the fibrillated PTFE in the elastomer material.

Effective amounts of molybdenum disulfide lie in the range from bout 1% to about 30% by weight of the composition, and are determined by addition to the composition as it is being mixed. The amount of molybdenum disulfide which is effective appears to depend upon the quality and nature of the particulate material and the quantity of molybdenum disulfide. Where the molybdenum disulfide and PTFE are premixed, the premixed PTFE-molybdenum disulfide additive preferably contains about one part by weight of molybdenum disulfide for each three parts by weight of PTFE.

Exemplary specific and representative functionalized silicone compound includes but are not limited to: treated amorphous silica chemically modified with methymethacrylate or epoxy functionality such as is described in U.S. Pat. No. 5,412,014, which is herein by fully incorporated by reference. Functionalized silicone compounds comprise from 0.5 to 25 parts by weight of a silicone polymer powder, said silicone polymer powder having an average particle size of 1 to 1000 microns and comprising (i) 100 parts by weight of a polydiorganosiloxane polymer and from (ii) 10 to 150 parts by weight of a silica filler. Preferably the polydiorganosiloxane polymer contains at least one functional group selected from the group consisting of hydroxyl and vinyl in its molecule. The molecular weight of this polymer is sufficient to impart a viscosity of from about 100 to 100,000,000 mPa-s (centipoise) to the polymer at 25° C. The organic groups of the polydiorganosiloxane are independently selected from the group consisting of hydrocarbons or halogenated hydrocarbon radicals such as alkyl and substituted alkyl radicals containing from 1 to 20 carbon atoms; alkenyl radicals such as vinyl and 5-hexenyl; cycloalkyl radicals such as cyclohexyl; and aromatic hydrocarbon radicals such as phenyl, benzyl and tolyl. Preferred organic groups are lower alkyl radicals containing from 1 to 4 carbon atoms, phenyl, and halogen substituted alkyls such as 3,3,3-trifluoropropyl. The polydiorganosiloxane can be a homopolymer, a copolymer or a terpolymer containing such organic groups. Non-limiting examples would include gums comprising dimethylsiloxy units and phenylmethylsiloxy units; dimethylsiloxy units and diphenylsiloxy units; dimethylsiloxy units; diphenylsiloxy units; and phenylmethylsiloxy units. Most preferably, component (i) of the silicone powder is a polydimethylsiloxane which is terminated with a vinyl group at each end of its molecule and/or contains at least one vinyl group along its main chain. Component (ii) of the silicone powder is a finely divided filler derived from fumed precipitated or mined forms of silica. The former two fillers are typically characterized by surface areas greater than about 50 $m^2/g$. The silica filler is preferably treated by reaction with a liquid organosilicon compound containing silanol groups or hydrolyzable precursors of silanol groups. Compounds that can be used as filler treating agents, are also referred to as anti-creeping agents, and include such components as low molecular weight liquid hydroxy- or alkoxy-terminated polydiorganosiloxanes and hexaorganodisilazanes. The silicon-bonded hydrocarbon radicals in all or a portion of the filler treating agent can contain substituents such as carbon-carbon double bonds. In general, an alkoxysilane adhesion promoter (iii) is also incorporated in the silicone polymer powder composition. This alkoxysilane adhesion promoter contains at least one alkoxy group having 1 to 4 carbon atoms and at least one group selected from epoxy, acryloxy, methacryloxy, vinyl, phenyl or N-β-(N-vinylbenzyl amino) ethyl-γ-aminoalkyl hydrochloride in its molecule. When the alkoxysilane adhesion promoter is employed, it is added at a level of about 0.5 to about 15 parts by weight for each 100 parts by weight of said silicone polymer powder.

Exemplary specific and representative hydrated metallic silicates include but are not limited to: hydrated magnesium silicates, and hydrated aluminum silicates while hydrated metal borates include, but are not limited to: hydrated zinc borate.

Exemplary specific and representative primary antioxidants include but are not limited to: hindered phenols, e.g., tetrakis methylene (3,5-di-t-butyl-4-hydroxyhydrocinnamate)methane or (octadecyl 3-(3',5'-di-t-butyl-4'-hydroxyphenyl)propionate).

Exemplary specific and representative secondary antioxidants include but are not limited to: phosphites, e.g., bis(2, 4-dicumylphenyl)pentaerythritol diphosphite and thioesters.

Normally, flame retarding of plastics by means of compounding standard flame retardant additives into polymer melts results in a beneficial improvement in flame resistance but also results in compromised or deteriorated physical properties, typically impact strength. The object of this invention is to melt compound a halogenated organic flame retardant additive as well as other flame retarding enhancing additives into a molten polyolefin in the presence of an impact modifier such as a semi-crystalline ethylene copolymer which may be chemically functionalized. Without being held to any one theory of operation, it is believed that the purpose of the functionalized semi-crystalline ethylene copolymer is twofold. First, the acid group functionality of this polyolefin based copolymer allows for adhesion of this polymer to high energy surfaces and enhances compatibility with numerous polar substrates. In addition, this functional copolymer imparts increased system compatibility which permits increased filler/additive concentrations as well as property enhancement. Second, the composition and inherent properties of the functionalized semi-crystalline ethylene copolymer decrease stiffness and increases low temperature impact. Other functionalities which are expected to accomplish adhesion to high energy surfaces and polar substrates would include: amine, carboxyl, epoxy, isocyanate, acrylate, acetate, methacrylic acid and silane modified polymers.

It is expected that due to the polarity associated with the halogen-carbon bond of the halogenated organic flame retardant additives that the functionalized semi-crystalline ethylene copolymer may act a compatibilizing agent between the polar flame retardant additive and the polyolefin. This would also enhance the low temperature performance of the flame retardant composition.

The non-functional semicrystalline ethylene copolymer remains flexible over a large range of temperatures and exhibits excellent low temperature performance and also accepts fillers and mixes easily as evidenced by the −40 impact data. If the copolymer did not remain flexible over this large temperature range, the low temperature impact data would reflect brittle and ductile failures, results which are not seen in this system.

When metal oxides such as antimony trioxide are also present in the melt compounded flame retardant composition, it behaves as a synergist with the halogenated organic compound and forms antimony halides, hydrogen halides, as well as various antimony oxyhalide compounds which perform in the flame phase reaction and acts as radical acceptors which in turn interfere with the radical chain mechanism. It is believed that the trivalent antimony facilitates the formation of halogen radicals which affect the radical chain reaction of flame spread. Alternatively, it may be possible that antimony oxyhalide or antimony halides reduce the rate at which halogen leaves the flame zone thus increasing the probability of reaction with the reactive species. Antimony halides probably evolve heavy vapors which form a layer over the condensed phase, stop oxygen attack and thus, choke out the flame.

When fluorocarbon fluoropolymers such as polytetrafluoroethylene are present in the melt compounded flame retardant composition and the composition has been worked on a screw, it forms a network of unoriented fibers which act as a drip suppressor that prevents the flame retardant polyolefin from dripping. Traditionally, achievement of a UL 94V-0 rating necessitated the use of mineral fillers such as clay or talc in the range of 14–30 weight percent to achieve an anti-dripping formulation. As discussed in U.S. Pat. No. 4,962,136, which is herein by fully incorporated by reference, the polytetrafluoroethylene (PTFE) is fibrillated and fibrillates during mixing so as to provide web-like structures within the polymer matrix. It is believed that the more extended and complex surface of the fibrillated PTFE may provide additional mechanical entanglement and engagement with the polymer composition. It is perhaps significant to note that PTFE that is manufactured as a coagulated dispersion is capable of fibrillation under shear. Other manufactured forms of PTFE do not fibrillate under shear.

The addition of a chemically functionalized silicone compound during melt compounding of the flame retardant polyolefin composition imparts processing and physical property improvements as well as improved compatibility. Functionalized silicone powder resin modifiers are available in different grades with various types of organic reactivity, (none, methacrylate, epoxy and amine). It is the functionality that determines the compatibility as well as the performance aspect in polyolefins. In general at low concentrations the functionalized or non-functionalized silicone resin modifiers tend to improve the processability of polyolefins which is exhibited in reduce extruder mixer torque which translates to reduced power consumption. As discussed in U.S. Pat. No. 5,412,014, mixtures which did not contain the silicone powder generally required much more torque to compound as compared to those that contained the silicone powders.

At higher loadings, the functionalized or non-functionalized silicone compounds modify the combustion process of polyolefins by reducing the rate of heat release, the rate of smoke, and carbon monoxide production as well as improving physical properties. The reduced heat release is believed to be a result of the silica or silica containing resin acting as a barrier to incoming heat radiation thus insulating the polyolefin from the combustion source. With synergy between the silicone modifier resin and organic halogenated flame retardant additives, functionalization of the silicone modifier resin improves the compatibility between organic halogenated flame retardant additives, inorganic flame retardant additives and the selected polyolefin which would in turn help the flame retardant composition retain impact strength.

The incorporation of inorganic flame retardants during melt compounding of the flame retardant composition, such as aluminum hydroxide, magnesium hydroxide and zinc borate disrupt the combustion process by physical effects. Inorganic compounds decompose during the combustion process to yield nonflammable gasses such as carbon dioxide or water which in turn have the effect of diluting the mixture of combustion products which are flammable gasses. In addition, the nonflammable decomposition gases have a shielding effect in which the surface of the polymer is shielded from oxygen and thermal attack. These inorganic flame retardants form glassy protective layers which also contribute to the shielding effect. It is believed that inorganic fillers perform flame retardancy by means of a heat absorbing reaction mode in combination with condensed phase reaction modes.

The incorporation of hydrated metal silicates or hydrated metal borates during melt compounding of the flame retardant composition reinforces the composition due to their lamellar shape which prevents the flame retardant composition from dripping during combustion testing.

The incorporation of a primary antioxidant during melt compounding such as hindered phenols and secondary aryl amines, is to protect the polyolefin from thermal oxidative degradation which is initiated via free radical formation. The consequences of polymer degradation are loss of physical properties, changes in molecular weight, molecular weight distribution, chain scission and cross linking reactions depending upon the nature of polyolefin. The primary, or free radical scavenging antioxidants inhibit oxidation via chain breaking reaction that interfere with the chain propagation step. They have reactive OH or NH functional groups that transfer a hydrogen to a free radical R· or peroxy radicals ROO·.

The incorporation of secondary antioxidants into the flame retardant composition during melt compounding, such as phosphites and thioesters, is to decompose hydroperoxides without intermediate formation of free radicals. As a consequence, they prevent chain-branching resulting from the decomposition of hydroperoxides into free radicals.

Thus, the invention has a unique composition of flame retardant additives that employ all three mechanisms of the proposed flame retardancy modes, namely, (1) Flame Phase Reaction, (2) Condensed Phase Reaction, and (3) Heat Absorption Reaction. This unique combination allows for the present invention to incorporate lower flame retardant additive loadings than are typically needed for high flame retardant ratings. This, when coupled with the use of impact modifiers greatly enhances the retention and ultimately improves the impact strength of the invention. After the compositions of this invention are mixed thoroughly so ensure that all components are uniformly dispersed therein, the resulting flame retardant-impact modified polyolefin composition can be further processed by conventional techniques, such as sheet extrusion, vacuum forming, injection molding, blow molding, compression molding or in particular, rotational molding, to fabricate plastic components or parts.

EXAMPLES

The following examples are presented to further illustrate the method and compositions of this invention, but are not to be construed as limiting the invention, which is delineated in the appended claims. All percentages in the examples are based on a weight basis unless indicated to the contrary.

Example 1

Each formulation having the proportions listed in Table 1, was compounded in a laboratory size "00" Banbury type internal mixer. The body temperature was set at 240° F., the rotor temperature was set at 220° F. All ingredients were loaded in one initial charge and the ram lowered (with 60–80 psi) and allowed to mix for up to 5 minutes with rotor speeds between 116 and 155 rpm. After compounding for up to 5 minutes the batch was dropped and sheeted off on a two roll mill and allowed to harden before granulating by means of a Nelmore granulator. The formulations were then injection molded into flammability test bars measuring 3.2 mm×12.7 mm ×127 mm (⅛×½×5 in) by means of a Battenfeld Injection Molding Machine, model 350 plus. Molding parameters were as follows: Zone 3=40° C., Zone 2=165° C., Zone 1=175° C., Nozzle=30%, Mold temperature=65° F., Mold Closing pressure=95%, Maximum Injection Pressure=79%, Metering Stroke=24.5%, Metering Velocity=27%.

In addition, the impact specimens were compression molded in the following manner: 190 grams of granulated formula was placed between two steel plattens in a large 10×10 inch plaque mold of 0.12 inches in depth. The plattens were covered with high temperature polyester film to prevent the flame retardant formulations from sticking to the steel. The plattens were then placed in a heated press set at 190° C. under 2000 lbs force for 10 minutes. After the 10 minute duration, the plattens were removed from the heated press and immediately placed in a water cooled press under 25 tons of force for 15 minutes. Then the compression molded samples were removed from the press and disassembled from the plattens and mold then cut by means of a band saw to the dimensions of 2×2×0.12 inches.

The flammability test specimens were prepared and conditioned in accordance with Underwriters Laboratory standard UL-94. In this flame test, the sample is held vertically and ignited with a 20 mm test flame which is applied twice, each flame impingement time is 10 seconds in duration, a piece of surgical cotton is also place below the sample to determine weather or not dripping particles will ignite the cotton. The response of the sample to the ignition source is classified according to the following:

| 20 mm vertical Burning Test; UL94V-0, 94V-1, or 94V-2 Material Classifications | | | |
|---|---|---|---|
| Criteria Conditions | 94V-0 | 94V-1 | 94V-2 |
| After flame time for each individual specimen | ≦10 s | ≦30 s | ≦30 s |
| Total after flame time for any conditions set of 5 | ≦50 s | ≦250 s | ≦250 s |
| After flame + afterglow time for each individual specimen after 2nd flame impingement | ≦30 s | ≦60 s | ≦60 s |
| After flame or afterglow of any specimen to clamp | No | No | No |
| Cotton indicator ignited by flaming drips | No | No | Yes |

Impact specimens were conditioned at 70 F. and 50% relative humidity for at least 40 hours prior to placing them in a freezer controlled at −40 F. for a minimum of 4 hours before testing. The specimens were removed from the freezer one at a time and immediately tested with a Gardner-SPI Modified Variable Height Impact Tester. A total of five specimens from each formula were tested, one at each of the following drop heights: 256 in-lb, 272 in-lb, 288 in-lb, 304 in-lb, and 320 in-lb, for samples (A) through (G), while a drop height of 256 in-lb was used for all of the samples (H) & (I). Impact results were classified as: Pass—no complete rupture through specimen. Ductile Failure—specimen is elongated and a hole is punctured through the specimen. Brittle Failure—specimen shatters and fractures into pieces or when the impacted areas break loose without elongation. The percentage of pass-fail test results of the five tests are recorded in Table 1.

TABLE 1

| | Weight Percent per Composition | | | | | | | | |
|---|---|---|---|---|---|---|---|---|---|
| Component | A | B | C | D | E | F | G | H | I |
| Linear low density polyethylene[a] | 72.5 | 70 | 67.5 | 65 | 62.5 | 70.56 | 47.25 | 51.64 | 100 |
| Halogenated flame retardant[b] | 22 | 24 | 26 | 28 | 30 | 22 | 22 | 22[b'] | 0 |
| Antimony Oxide | 5.5 | 6.0 | 6.5 | 7.0 | 7.5 | 5.5 | 5.5 | 5.5 | 0 |
| Teflon homopolymer with $MoS_2$ [c] | 0 | 0 | 0 | 0 | 0 | 0.25 | 0.25 | 0 | 0 |
| Teflon homopolymer[d] | 0 | 0 | 0 | 0 | 0 | 0 | 0 | 0.25 | 0 |
| Silicone[e] | 0 | 0 | 0 | 0 | 0 | 0.49 | 0 | 0.49 | 0 |
| Zinc borate[f] | 0 | 0 | 0 | 0 | 0 | 1.2 | 0 | 0 | 0 |
| Impact Modifier DEFA-1373[g] | 0 | 0 | 0 | 0 | 0 | 0 | 25 | 0 | 0 |
| Impact Modifier DFDB-9042[h] | 0 | 0 | 0 | 0 | 0 | 0 | 0 | 20 | 0 |
| Phosphite Antioxidant[i] | 0 | 0 | 0 | 0 | 0 | 0 | 0 | 0.08 | 0 |
| Hindered Phenol Antioxidant[j] | 0 | 0 | 0 | 0 | 0 | 0 | 0 | 0.04 | 0 |
| Experimental Test Results | | | | | | | | | |

TABLE 1-continued

| Component | Weight Percent per Composition | | | | | | | | |
|---|---|---|---|---|---|---|---|---|---|
| | A | B | C | D | E | F | G | H | I |
| UL 94V | V-2 | V-1 | V-1 | V-1 | V-1 | V-0 | V-0 | V-0/5VA | NR |
| 40 impact (%) pass | 60 | 40 | 20 | 0 | 20 | 40 | 100 | 100 | 0 |
| 40 impact (%) ductile failure | 40 | 60 | 80 | 100 | 60 | 40 | 0 | 0 | 100 |
| 40 impact (%) brittle failure | 0 | 0 | 0 | 0 | 20 | 20 | 0 | 0 | 0 |

(a)MP 635-661 linear low density polyethylene (Quantum Chemical)
(b)Saytex 8010 halogenated flame retardant (Albemarle) wherein X = $CH_2CH_2$
(b')Saytex 102-E halogenated flame retardant (Albemarle) wherein X = O (c)Alphaflex-101 (Alphaflex Ind.), a soft polymer of PTFE granules (75% by Weight coated with refined $MoS_2$ (25% by weight), compounding with sufficient shear will result in fibril formation of 0.4 to 0.6 microns in diameter, the small PTFE granules are fibrillated or drawn into fibrils and dispersed as a reinforcing network throughout the elastomer
(d)Fluon CD-1 (ICI Americas, Inc.), having an apparent density of 500 g/L, a median particle size of 500 microns, a melting point of 342° C. for virgin material, (327° C. for once melted material, and a specific gravity of between 2.19 and 2.22
(e)Dow 4-7081 (Dow Corning), silicone powder with methacrylate organic reactivity
(f)ZB-400 (Polymer Additives Group) - $4ZnO.6B_2O_3.7H_2O$
(g)DEFA-1373 impact modifier (Union Carbide), functionalized low crystallinity ethylene copolymer which enhances adhesion of the polymer to high energy surfaces and enhances compatibility with polar polymers
(h)DFDB-9042 impact modifier (Union Carbide), a flexible semi-crystalline ethylene copolymer with low density and high melt index
(i)Doverphos S-9228 (Dover Chemical)

(j)Dovernox-10 hindered phenol antioxidant (Dover Chemical), tetrakis methylene (3,5-di-t-butyl-4-hydroxyhydrocinnamate)methane From the Table, it can be seen that one of the preferred compositions of the present invention (Sample G) performed as well as or better in the −40 Impact test than conventional flame retardant combinations which did not contain a polytetrafluoroethylene fluoropolymer, a chemically functionalized silicone additive, an inorganic Boron containing compound and a chemically functionalized impact modifier (Samples A through E).

Interestingly, composition (H), which includes both a primary antioxidant as well as a secondary antioxidant achieved an additional flame rating classification of UL94-5VA. This flame rating test method determines the relative burning characteristics and the resistance to burn-through of plastics using small bar and plaque specimens exposed to a 125 mm flame. In this procedure, the sample is held vertically and ignited with a 125 mm test flame which is applied five times, each flame impingement has a 5 second duration and the duration between flame impingements is 5 seconds also. This part of the procedure is performed on a set of five test specimens of the same dimensions as stated previously for the UL94 test. The second portion of this test is performed on three plaques of 150 mm×150 mm of the desired thickness, in this case it was 0.12 inches. The plaques are supported so its edges are horizontal. The plaque specimens are also subjected to 5 flame impingements of 5 second duration. The response of the sample to the ignition source is classified as follows:

| 125 mm Vertical Burning Test; 94-5VA or 94-5VB Material Classifications | | |
|---|---|---|
| Criteria Conditions | 94-5VA | 94-5VB |
| After flame time plus afterglow time after fifth flame impingement for each bar | ≦60 s | ≦60 s |
| Cotton indicator ignited by flaming drips | No | No |
| Burn through (hole) of any plaque | No | Yes |

While formulations (A) through (E), all contained sufficient halogen and antimony to extinguish combustion, these compositions dripped either flaming particles as identified by the UL94 V-2 rating of formula (A) or by the UL94 V-1 ratings of samples (B) through (E). In addition, these formulations also exhibited less then desired −40 impact strengths. A trend can be seen that as the flame retardant and antimony oxide content increase, the percentage of impact specimens that pass the test decreases while the percentage of ductile failures increases to the point that brittle failure occurs, as it did in formula (E).

Formula (F) is significant in that this formulation did not emit flaming/non-flaming drips at all, thus achieving a UL94 V-0 flame rating. This experiment shows that PTFE in combination with Dow Corning 4-7081 functionalized silicone powder prevents the composition from dripping. Zinc borate was added to assist the halogen/antimony combination in flame suppression by cooling the surface temperature by releasing its water of hydration as well as producing a layer of inorganic matter that shields the polymer / flame interface. It is known that zinc borate acts as an afterglow suppressor. Afterglow is characterized by a glowing ember after a fire is extinguished. However, this formulation did exhibit lower than desired impact strength. While this formula may be acceptable for some purposes, it is noted that several samples did experience brittle failure.

Formula (G) deleted the zinc borate and Dow Corning 4-7081 with the purpose of improving impact strength through these deletions coupled with the inclusion of a functionalized semi-crystalline ethylene copolymer chemically modified with maleic anhydride known as DEFA-1373. This system was designed to increase adhesion of the polymer to high energy surfaces and enhance compatibility between flame retardants, base polymer and impact modifier. This formula also produced a non-dripping UL 94 V-0 flame rating. Surprisingly, the −40 impact strength dramatically improved to 100% passage of all test specimens.

Formula (H) included the polytetrafluoroethylene Dow 4-7081 combination minus the maleic anhydride functionalized ethylene copolymer. Instead, a non-functionalized semi-crystalline ethylene copolymer known as DFDB-9042 was utilized. This composition also achieved the desired flame rating of UL94 V-0, but in addition, it also achieved the more stringent UL94-5VA flame classification as well. This formulation also exhibited 100% passage of −40 impact test specimens. This formula indicates that the DFDB can be used in place of the functionalized analog DEFA-1373 at a lower percentage which can translate into lower raw material costs.

Formula (I) is a control comprised of 100% linear low density polyethylene (MP635–661). When tested for −40 impact strength, all specimens exhibited elongation to the point of a small rupture the size of a pin hole which is classified as a ductile failure. This material did not achieve a flame rating. The experimental results clearly demonstrate the value of the present invention in regard to its extremely high combustion resistance coupled with improved low temperature impact.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

I claim:

1. A flame retardant polyolefin composition with improved impact which comprises:
    at least one polyolefin polymer;
    at least one halogen-containing organic flame retardant, said halogen being chlorine or bromine;
    at least one ethylene copolymer impact modifier,
        the copolymer selected from the group consisting of functionalized semi-crystalline ethylene copolymers and non-functionalized semi-crystalline ethylene copolymers;
    at least one oxygen-containing metal compound wherein the metal is selected from the group consisting of Group III, IV, V, and VI of the Periodic Table; and
    at least one fluoropolymer,
        at least a portion of which is fibrillated or fibrillatable.
    wherein said copolymer and said polyolefin polymer are not the same polymer.

2. The composition of claim 1 which further comprises at least one of
    a functionalized silicone polymer,
    a hydrated metal silicate,
    a hydrated metal borate,
    a primary antioxidant, and
    a secondary antioxidant.

3. The composition of claim 2 wherein the polyolefin is a polyethylene.

4. The composition of claim 3 wherein the polyolefin is a linear low density polyethylene.

5. The composition of claim 1 wherein the at least one ethylene copolymer is a functionalized semi-crystalline ethylene copolymer selected from the group consisting of butene-ethylene, hexene-ethylene and octene-ethylene copolymers chemically modified with an anhydride.

6. The composition of claim 1 wherein the fluoropolymer comprises from about 2% to about 100% fibrillated polytetrafluoroethylene.

7. The composition of claim 6 which further comprises molybdenum disulfide.

8. The composition of claim 2 wherein the functionalized silicone polymer is amorphous silica chemically modified with an acrylate or an epoxy functionality.

9. The composition of claim 2 wherein the halogen-containing organic flame retardant compound is selected from the group consisting of an organic aromatic halogenated compound, an organic cycloaliphatic halogenated compound and an organic aliphatic halogenated compound,
    the hydrated metal silicate is selected from the group consisting of hydrated magnesium silicates and hydrated aluminum silicates,
    the hydrated metal borate is zinc borate,
    the primary antioxidant is a hindered phenol, and
    the secondary antioxidant is selected from the group consisting of phosphites and thioesters.

10. The composition of claim 1 wherein:
    the at least one ethylene copolymer is present in an amount of from about 5% to about 40% by weight;
    the at least one halogen-containing organic flame retardant is present in an amount sufficient to impart a halogen content to the composition of from about 6 to about 40% halogen content by weight;
    the at least one oxygen-containing metal is present in an amount of from about 3% to about 10%; and
    the at least one fluoropolymer is present in an amount of from about 0.05% to about 1.0% by weight.

11. The composition of claim 2 wherein the
at least one of
the at least one functionalized silicone polymer is present in an amount up to about 5% by weight,
the hydrated metal silicate is present in an amount up to about 20% by weight,
the hydrated metal borate is present in an amount up to about 20% by weight,
the primary antioxidant is present in an amount up to about 1% by weight, and
the secondary antioxidant is present in an amount up to about 1% by weight.

12. A process for improving the impact of a flame retardant polyolefin composition which comprises the step of melt compounding a polyolefin polymer with:
at least one halogen-containing organic flame retardant said halogen being chlorine or bromine;
at least one ethylene copolymer impact modifier,
the copolymer selected from the group consisting of functionalized semi-crystalline ethylene copolymers and non-functionalized semi-crystalline ethylene copolymers;
at least one oxygen-containing metal compound wherein the metal is selected from the group consisting of Group III, IV, V, or VI of the Periodic Table; and
at least one fluoropolymer,
at least a portion of which is fibrillated or fibrillatable;
wherein said copolymer and said polyolefin polymer are not the same polymer.

13. The process of claim 12 which further comprises the step of adding
at least one of
a functionalized silicone polymer,
a hydrated metal silicate,
a hydrated metal borate,
a primary antioxidant, and
a secondary antioxidant.

14. The process of claim 12 wherein
the polyolefin is a polyethylene.

15. The process of claim 14 wherein
the polyolefin is a linear low density polyethylene.

16. The process of claim 12 wherein
the at least one ethylene copolymer is a functionalized semi-crystalline ethylene copolymer selected from the group consisting of butene-ethylene, hexene-ethylene and octene-ethylene copolymers chemically modified with an anhydride.

17. The process of claim 12 wherein
the fluoropolymer is polytetrafluoroethylene.

18. The process of claim 17 wherein
the fluoropolymer comprises from about 2% to about 100% fibrillated polytetrafluoroethylene.

19. The process of claim 18 wherein the polytetrafluoroethylene further comprises molybdenum disulfide.

20. The process of claim 13 wherein
the functionalized silicone polymer is amorphous silica chemically modified with an acrylate or an epoxy functionality.

21. The process of claim 13 wherein
the halogen-containing organic flame retardant compound is selected from the group consisting of an organic aromatic halogenated compound, an organic cycloaliphatic halogenated compound and an organic aliphatic halogenated compound,
the hydrated metal silicate is selected from the group consisting of hydrated magnesium silicates and hydrated aluminum silicates,
the hydrated metal borate is zinc borate,
the primary antioxidant is a hindered phenol, and
the secondary antioxidant is selected from the group consisting of phosphites and thioesters.

22. The process of claim 12 wherein
the at least one ethylene copolymer is present in an amount of from about 5% to about 40% by weight;
the at least one halogen-containing organic flame retardant is present in an amount sufficient to impart a halogen content to the composition of from about 6 to about 40% halogen content by weight;
the at least one oxygen-containing metal of Group III, IV, V, or VI of the Periodic Table is present in an amount of from about 3% to about 10%; and
the at least one fluoropolymer is present in an amount of from about 0.05% to about 1.0% by weight.

23. The composition of claim 12 wherein
the at least one functionalized silicone polymer is present in an amount up to about 5% by weight,
the hydrated metal silicate is present in an amount up to about 20% by weight,
the hydrated metal borate is present in an amount up to about 20% by weight,
the primary antioxidant is present in an amount up to about 1% by weight, and
the secondary antioxidant is present in an amount up to about 1% by weight.

* * * * *

UNITED STATES PATENT AND TRADEMARK OFFICE
CERTIFICATE OF CORRECTION

PATENT NO : 6,162,851
DATED : December 19, 2000
INVENTOR(S) : Michael W. WOOD, Steven D. LANDAU, Victor W. LEE, and Ralph W. WYKOFF It is certified that error appears in the above-identified patent and that said Letters Patent is hereby corrected as shown below:

Col. 14, line 13
 replace "period (.)"
 with --semicolon (;)--.

Signed and Sealed this

Fifteenth Day of May, 2001

Attest:

NICHOLAS P. GODICI

Attesting Officer  Acting Director of the United States Patent and Trademark Office